(144.)
JAMES ROBINSON.
Improvement in Feed Racks.
No. 122,967.  Patented Jan. 23, 1872.
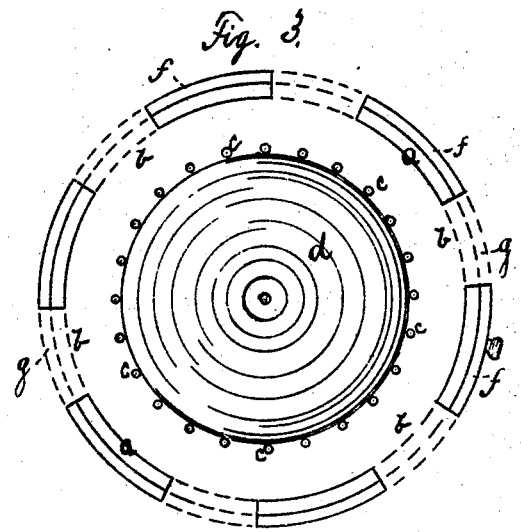
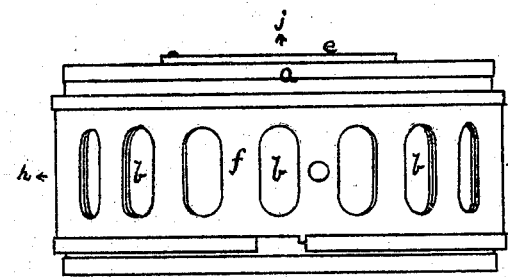
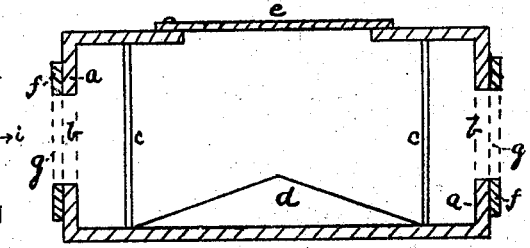

122,967

UNITED STATES PATENT OFFICE.

JAMES ROBINSON, OF CARMEL, MAINE.

IMPROVEMENT IN FEED-RACKS.

Specification forming part of Letters Patent No. 122,967, dated January 23, 1872.

*To all whom it may concern:*

Be it known that I, JAMES ROBINSON, of Carmel, in the county of Penobscot and State of Maine, have invented a new and useful Improved Feed-Box for Sheep; and I hereby declare the following to be a full, clear, and exact description of my invention, which will enable others to make and use the same, reference being had to the accompanying drawing forming part of this specification, in which—

Figure 1 shows a side view of my invention; Fig. 2, a section through line $j\ k$; Fig. 3, a section through line $h\ i$.

The object of my invention is to furnish a sheep-feeding box or rack which shall be cheap, economical of the feed, easily moved from place to place, and which may be quickly and easily closed up when the sheep are through feeding. This is an important point, as the young lambs are apt to get into the ordinary racks to sleep, and dirt the fodder so that the sheep often refuse to eat it, thus wasting much.

Reference to the drawing will explain the character of my device. My rack is circular in form, as at $a$, consisting of a round box with feed-holes $b\ b$ in the sides thereof, admitting the heads of the animals inside. A short distance from the sides of the box is a circular row of slats, $c\ c$, preventing the sheep from getting the feed too rapidly, so as to waste it, but allowing them to pull out enough at a time for their wants. Within these slats the rack is provided with a conical bottom, $d$, its base at the bottom of the box. This serves to distribute equally to all sides the grain, it being poured from the top upon the apex of the cone $d$. A cover, $e$, enables the rack to be made tight in case of storm. Around the outside of the box $a$ is a sliding band, $f$, wide enough to cover the feed-holes $b\ b$. This band is likewise provided with feed-holes $g$ corresponding to those in the box $a$, and is so constructed as to slide easily over them, the intervals between the holes $g$ in the band covering the holes in the box $a$.

When the sheep are to be fed the band or shutter $f$ is slid back, bringing its holes $g$ opposite the holes $b\ b$ in the box $a$, and opening it to the sheep, the band $f$ and box $a$ being so arranged that the holes $b\ b$ in the box are opened or closed simultaneously by the movement of said band. This allows the lambs to be kept out of the rack, and the fodder is thus kept sweet and clean.

The circular form of the box permits it to be rolled from place to place, as desired, and saves the necessity of carting it. It also is economical in regard to the space it occupies, and allows more sheep to feed at once without crowding each other.

I am aware that sheep-racks somewhat similar have been made before, as in the patent of A. Allerton, November 15, 1864; but this differs from mine in several particulars, it not being so convenient to move from place to place, nor can it have applied to it the band or shutter $f$ closing simultaneously all the feeding-holes, as in the case of my device. I do not claim the device shown in the said patent of Allerton; but

What I claim as my invention, and desire to secure by Letters Patent, is—

The improved feed-box for sheep constructed as herein described, to wit, having the circular box $a$ with feed-holes $b$, conical bottom $d$, slats $c\ c$, cover $e$, and sliding doors or shutter $f$, all arranged substantially as and for the purposes set forth.

JAMES ROBINSON.

Witnesses:
WM. FRANKLIN SEAVEY,
RUFUS ROBINSON.